(No Model.)

C. C. PALMER.
REFRIGERATING CAR.

No. 290,600. Patented Dec. 18, 1883.

Fig. 1.

WITNESSES
Wm. A. Skinkle
Geo. W. Breck

By his Attorney

INVENTOR
Cassius C. Palmer
Livingston Gifford (No Model.) 5 Sheets—Sheet 2.

C. C. PALMER.
REFRIGERATING CAR.

No. 290,600. Patented Dec. 18, 1883.

WITNESSES
Wm. A. Skinkle
Geo. W. Breck

By his Attorney

INVENTOR
Cassius C. Palmer
Livingston Gifford

(No Model.)

C. C. PALMER.
REFRIGERATING CAR.

No. 290,600.  Patented Dec. 18, 1883.

WITNESSES
Wm A. Skinkle.
Geo. W. Breck.

By his Attorney

INVENTOR
Cassius C. Palmer
Livingston Gifford (No Model.) 5 Sheets—Sheet 4.

C. C. PALMER.
REFRIGERATING CAR.

No. 290,600. Patented Dec. 18, 1883.

WITNESSES
Wm A. Skinkle
Geo. W. Breck

INVENTOR
C. C. Palmer
By his Attorneys
Gifford & Gifford (No Model.)  5 Sheets—Sheet 5.

C. C. PALMER.
REFRIGERATING CAR.

No. 290,600.  Patented Dec. 18, 1883.

WITNESSES  
Wm A. Skinkle  
Geo. W. Breck

By his Attorneys  
Gifford & Gifford

INVENTOR  
C. C. Palmer

UNITED STATES PATENT OFFICE.

CASSIUS C. PALMER, OF NEW YORK, N. Y.

REFRIGERATING-CAR.

SPECIFICATION forming part of Letters Patent No. 290,600, dated December 18, 1883.

Application filed August 15, 1883. (No model.)

*To all whom it may concern:*

Be it known that I, CASSIUS C. PALMER, a citizen of the United States, residing at New York, in the county of New York and State of New York, have invented certain new and useful Improvements in Refrigerating-Cars, of which the following is a specification, reference being had therein to the accompanying drawings.

In my application filed on the 30th day of December, 1882, I described an apparatus especially adapted for utilizing chloride of ethyl as a medium of refrigeration, by means of its compression and expansion.

The object of my present invention is to construct a machine which may be used to advantage to refrigerate air in railroad-cars by means of the compression, cooling, and expansion of a volatile fluid, and which machine is also especially adapted for employing chloride of ethyl as the volatile fluid.

The apparatus may be divided into two parts.

First. The apparatus by means of which the gas-compressing engine is driven. This apparatus may be used on cars to advantage for driving engines or other machines—such as dynamo machines—which may be located on the car for generating electricity for electric lighting or other purposes.

Second. The apparatus for compressing the gas, cooling it, expanding it, and conducting the air into such proximity to it that the heat of the air is absorbed by the gas.

When my apparatus is applied to a refrigerating-car the walls of the car are constructed in a non-conducting manner, and the interior of the car is divided into four compartments, as follows:

A is the compartment where the articles to be refrigerated are placed, and which, when used for meat, is provided at its top with rods $a\ a$, running longitudinally along the ceiling, to which are attached the meat-hooks $a'\ a''\ a'''\ a''''$. A suitable air duct or ducts is arranged within this chamber for the purpose of distributing or drawing off the air at such points as to keep up an equable distribution of the cold air among the articles being refrigerated. In the drawings, this duct is represented at $b$ as extending longitudinally along the center of the ceiling of the car, with perforations at frequent intervals, and into which the air from the car is drawn.

Figure 1:
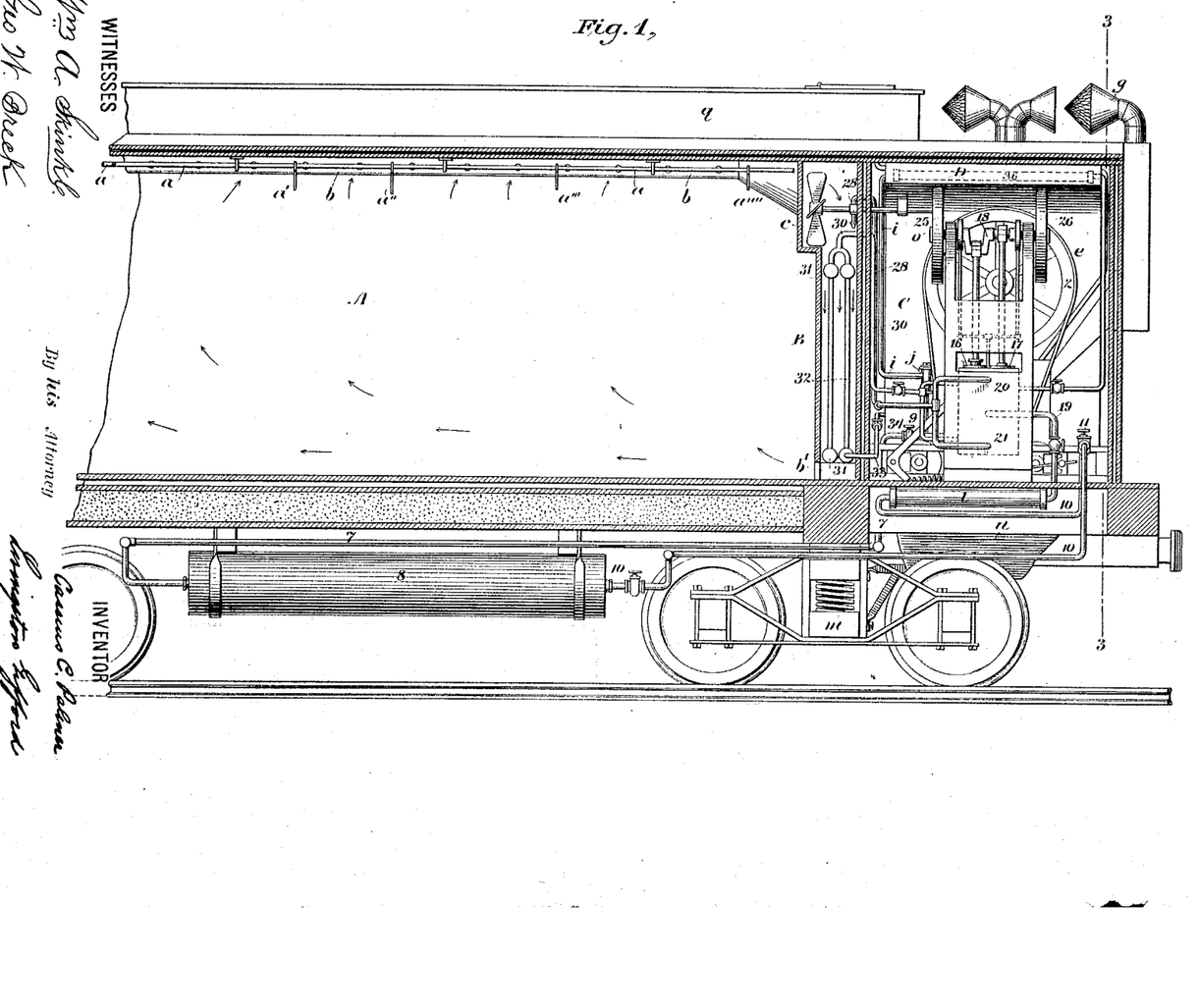
Figure 1 represents a vertical section through the line 1 1 of Fig. 3.

B is a compartment, which is preferably located, as shown, at one end of the apartment A, and which is used for inclosing a fan-blower (in case a fan-blower is used) and the refrigerator of the air-cooling apparatus. The air-duct $b$, in the arrangement shown in the drawings, connects with this compartment B at its top, and an oblong opening, $b'$, extends preferably all the way across the car, connecting the bottom of the compartment B with the bottom of the compartment A. By this arrangement, when the fan-blower $c$ is revolved in the manner hereinafter referred to, the air is drawn into the openings of the duct $b$, conducted to the compartment B, where it comes in contact with the refrigerator of the air-cooling apparatus, and whence it is discharged through the opening $b'$ and into the compartment A, to be again drawn into the duct $b$, and the operation repeated. The arrows in Fig. 1 represent the direction taken by the air in being thus circulated.

C is the compartment in which is placed the machinery for compressing the volatile fluid, and this compartment is preferably separated from the compartment B by a non-conducting wall, as shown.

Figure 3:
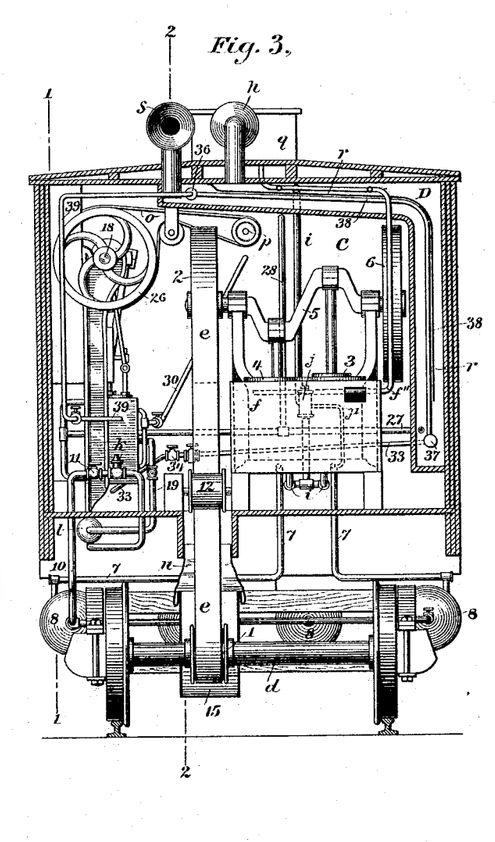
Fig. 3 is a vertical transverse section through the line 3 3, Fig. 1.

D, Fig. 3, is a compartment within which the condenser for cooling the volatile fluid is inclosed. This compartment D in the drawings is represented as L-shaped and extending partly across the ceiling of the compartment C and partly down one side of said compartment.

I will now describe the apparatus which I prefer to use for applying power to drive the gas-compressing engine.

In constructing an apparatus of this kind on a railroad-car to receive power from the axle of the car, it is desirable that provision should be made so that the varying speeds at which the axle revolves shall not produce a corresponding variation at the point of application of the power. It is also desirable that while the axles are revolving sufficient power should be stored to continue to drive the apparatus for a considerable time after the revolution of the axle has ceased, to provide for the detentions which a railroad-car is subject to.

Figure 10:
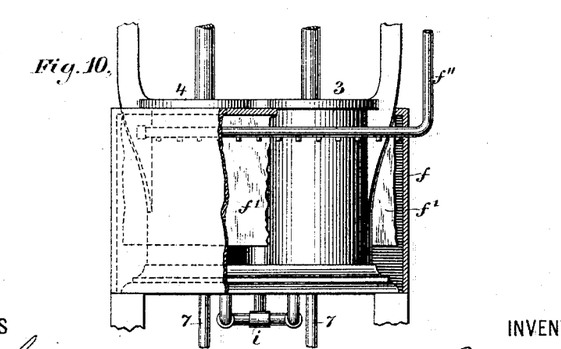
Fig. 10 represents in detail the casing and absorbent covering of the air-compressing cylinders.

Upon one of the axles, $d$, I place a pulley, 1. Around this pulley is placed a driving-belt, $e$, which extends through an opening of the floor of the car and around the driven pulley 2, which also acts as a fly-wheel of the air-compressing engine. The air-compressing engine is preferably located in one corner of the compartment C, and is of any ordinary construction, though I prefer to have it constructed with two single-acting cylinders, 3 4, Figs. 3 and 10, inclosed within a wooden casing, $f$, which confines a jacket of air around the cylinders 3 4, and prevents the compartment C becoming heated from those cylinders.

To still further carry off the heat generated by compressing the air in these cylinders 3 and 4, I locate a funnel, $g$, upon the roof of the car, and connect it by a pipe, $g'$, with the interior of the casing $f$. Another pipe (not shown in the drawings) is arranged to connect the interior of the casing $f$ with the outside atmosphere in any convenient way, so that the motion of the car causes air to enter the funnel $g$, and thence through the pipe $g'$ into the casing $f$, whence it escapes through the other air-duct, already referred to, and thus the air within the casing $f$ is constantly changed and the heat generated by the compression-cylinders is carried off into the open air. The carrying off of this heat may be still further facilitated by enveloping the cylinders within the casing $f$ with a wrapping of absorbent fibrous material, (shown in Figs. 2 and 10 at $f'$.) When this fibrous material is used, a water-pipe, $f''$, is arranged to convey to it a very small quantity of water from the water-reservoir situated on top of the car, so as to keep the fibrous material $f'$ constantly moist, and thereby aid the removal of the heat from the cylinders 3 4 by the evaporation of the water. The pistons within the cylinders 3 4 are driven from the same crank-shaft, 5, provided with two fly-wheels, 2 and 6. The suction-pipe of this air-compressing engine may be arranged in any suitable manner to take the air to be compressed either from the atmosphere outside of the car or from the atmosphere within the chill-room of the car, though in the arrangement shown in the drawings the air to supply the air-pump enters into the compartment D through the funnel $h$, passes in contact with the outside of the pipes of the condenser, and is thence conducted to the cylinders of the air-compressor through the pipe $i$. In this pipe, between the chamber D and the compression-cylinders, is introduced an automatic cut-off valve, $j$, which is connected by a pipe, $j'$, with the discharge-pipes from the compression-cylinders in such a way that when the compression of the air in these discharge-pipes reaches a certain point the supply of air to the compression-cylinders will be automatically cut off, and they will be run in a vacuum, thus preventing the performance by them of unnecessary work.

7 7 are the discharge-pipes from the air-compressing cylinders, which serve to conduct the compressed air from those cylinders to one or more compressed-air receptacles, such as 8 8 8 8, which are shown as located under the car, but which may be located on top or at any other convenient place. These compressed-air receptacles are preferably made in the form of cylinders, extending preferably longitudinally under the car, and constructed as long as the distances between the trucks will permit. They are preferably about fourteen inches in diameter and about four in number, though their size and number may be increased or diminished as the space will permit. A check-valve, 9, is located in each pipe 7, to prevent any air from returning from the cylinders 8 8 8 8 to the compressing-cylinders 3 4.

10 is a pipe connecting the compressed-air cylinders 8 with the gas-compressing engine, and in this pipe is located a check-valve, 11, which prevents any compressed air which has passed out of the cylinders 8 from returning thereto.

For the purpose of supplying the compressed air at a uniform pressure to the fluid-condensing pump, I introduce in the pipe 10 an automatic pressure-reducing valve, $k$, and a compressed-air reservoir, $l$. By setting the valve $k$ at the pressure requisite for driving the fluid-compressing pump, the reservoir $l$ is made to contain compressed air always at that pressure, and hence the velocity of the fluid-compression pump is preserved constant, no matter how high the pressure in the cylinders 8 8 8 8 may become.

Figure 2:
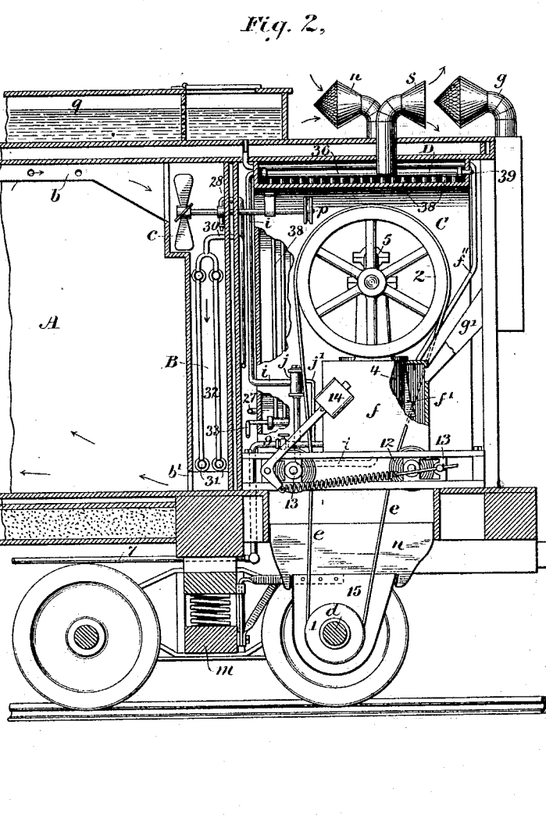
Fig. 2 represents a vertical section through the line 2 2 of Fig. 3, the casing of the condenser being partially broken to show the arrangement of pipes within.
Figure 4:
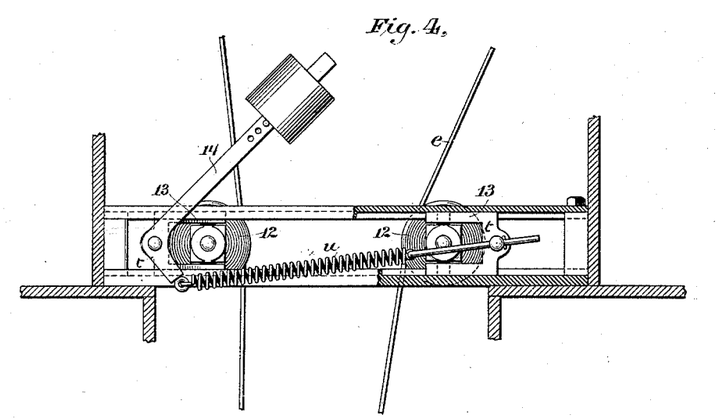
Figs. 4 and 5 represent detailed views of the belt-tightening mechanism.
Figure 5:
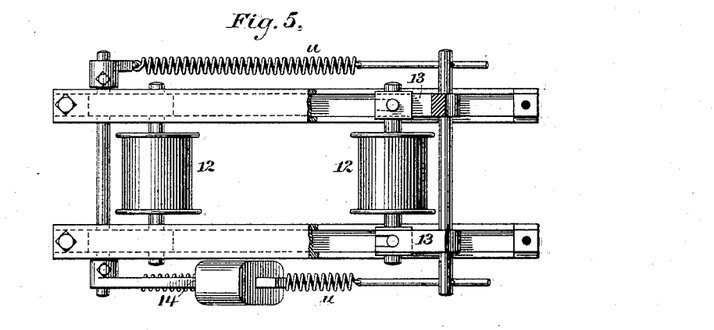
Figure 6:
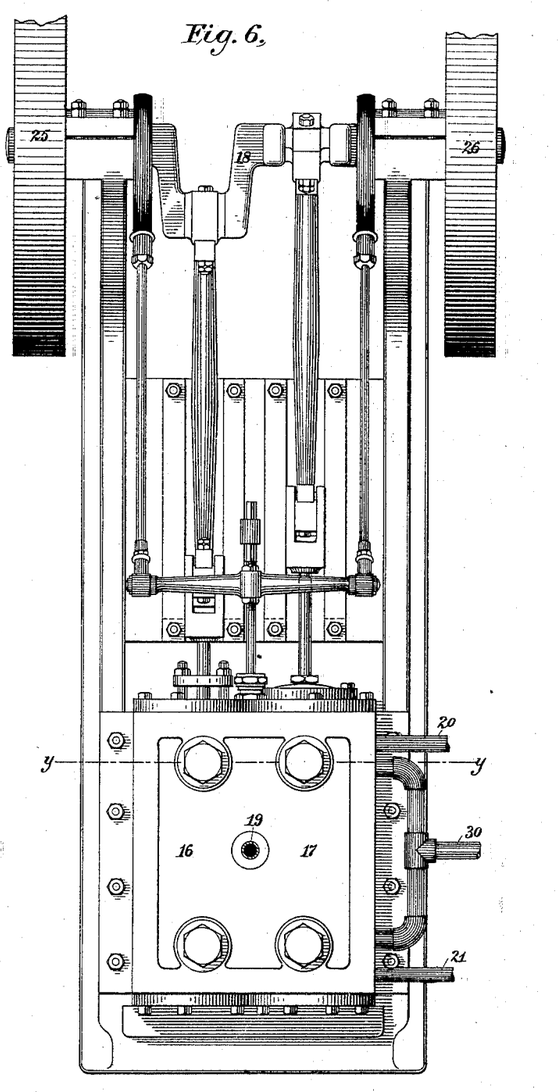
Figs. 6 and 7 represent two views of the pump used for communicating the expansive force of the air to compress the volatile fluid.
Figure 7:
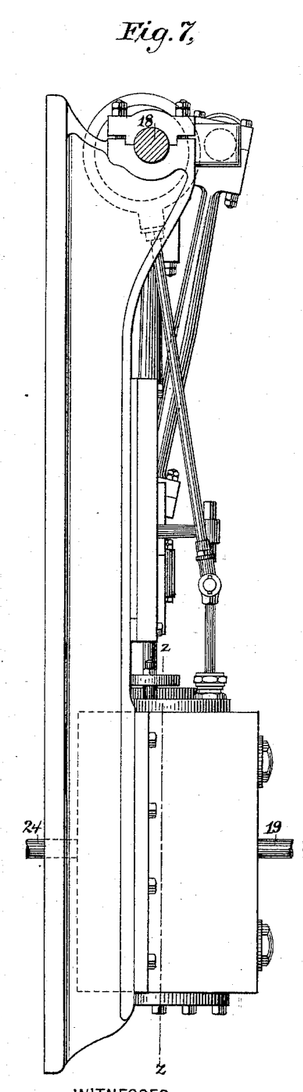
Figure 8:
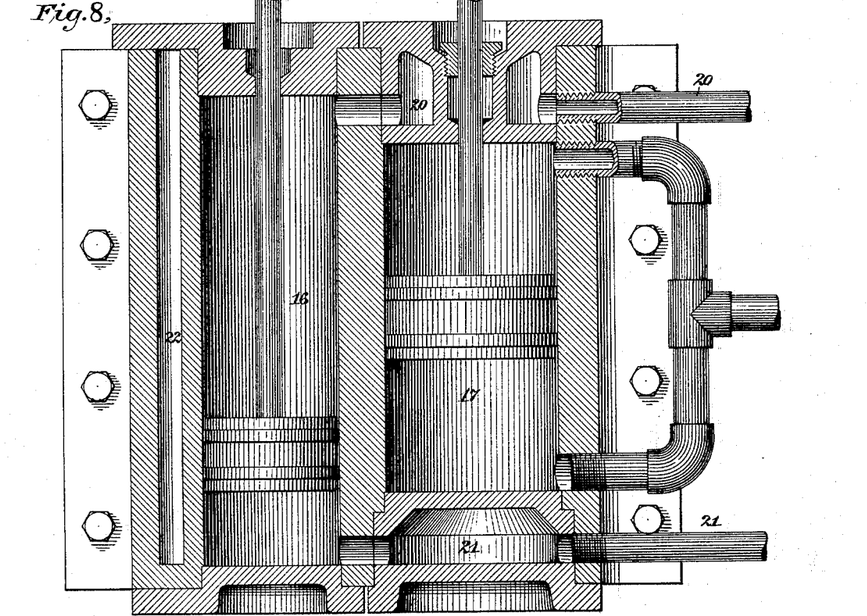
Fig. 8 represents a section through the cylinders of the pump or engine on the line $z\ z$, Fig. 7.

Figs. 4 and 5 show a mechanism for keeping the driving-belt $e$ tight, and yet allowing for sufficient extension of it to provide for the passing of the car around curves and for the action of the springs of the car. An elevation of this mechanism is shown in Figs. 2 and 4. This tightening mechanism consists of two friction-rollers, 12 12, mounted upon guides 13 13. The belt $e$ is passed between the rollers 12 12, as shown in Fig. 2, which are caused to bear against it on each side by suitable mechanism for pressing the rollers toward each other with a yielding pressure. This mechanism, as shown in the drawings, consists of the combination of a lever, 14, pivoted to the bearings of one of the pulleys 12. provided on its longer arm with a weight, and having its short arm secured to a spiral spring, u, which is connected with the bearings of the other pulley, and is of such length that when the two rollers are pressing against the belt from opposite directions the weight will be raised in the position indicated in Figs. 2 and 4. In passing around curves the belt will sometimes be inclined, so that one side of it would tend to press more heavily upon the pulleys 12 12 than the other side. To avoid this inequality of pressure the connections between the axles of the pulleys 12 12 and the sliding carriages t t, in which the bearings of these axles are located, are made in the form of universal joints, so as to permit the two pulleys to occupy positions in the guides 13 which will cause the pulleys to be inclined in accordance with the inclination of the belt.

For the purpose of preventing cinders or dust from coming in contact with the pulley 1 or belt, or other parts of the apparatus, I surround the pulley 1 on three sides by a metallic box or case, 15, which is firmly secured to the stationary spring-timber m of the truck by a bracket, as shown in Fig. 2. This casing 15 is connected with the floor of the car by a flexible (preferably canvas) apron, n, which excludes dust or ashes, and at the same time permits of the relative motion between the truck and body of the car.

The operation of the mechanism which I have just described for driving the gas-engine is as follows: The motion of the car-axle is communicated to the air-compressing pump through the medium of the driving-belt, which belt is kept tight by the mechanism shown in Figs. 4 and 5. The air-compressing engine takes air either from the outside atmosphere or from the interior of the chill-room, compresses it, and forces it through the pipe 7 into the cylinders 8 8 8 8, where it is retained under pressure.

In order to prevent the pressure of the air within the cylinders 8 8 8 8 from rising beyond a certain point, I adopt either of two devices. I either place in the pipe 7 a puppet-valve, which is regulated to blow off at the pressure which I desire to keep in the cylinders, or I place in the suction-pipe of the air-pump a cut-off valve, which is governed by the pressure generated in the pipe 7 and cylinders 8, so as to close the suction-pipe when the pressure reaches a certain point, and cause the pump to run under a vacuum. The latter is the arrangement which I have shown in the drawings. In this manner any desired pressure of air can be produced in the cylinders 8, which in practice will be in the neighborhood of from eighty to one hundred pounds. The pressure requisite for compressing chloride of ethyl (if that is the volatile fluid used) is only from ten to twenty pounds. In order to supply the compressed air from the cylinders 8 to the cylinders of the gas-compressing engine uniformly at about this pressure, I place in the pipes 10 one of the well-known forms of valve which is adapted for automatically regulating the pressure by which the air is supplied to the gas-compressing pump. By this arrangement air is stored in the cylinders 8 under pressure, which will continue to operate the gas-compressing pump for a considerable time after the car has stopped, and the pressure under which the air is supplied to the gas-compressing pump continues to be uniform, independent of any variation in the velocity of rotation of the axle of the car. This result is facilitated and insured by the interposition of the cylinder l in the pipe 10.

The apparatus which I have just described may be used to advantage on cars for running apparatus other than the refrigerating apparatus which I am about to describe, and I do not intend to limit myself to its application to refrigerating apparatus, excepting where such limitation is expressed in the claims.

Having described the apparatus which supplies and stores power to drive the gas-engine, I will now proceed to describe the arrangement of the apparatus by which the refrigeration of the air within the car is produced. This apparatus consists of three principal parts: first, the gas-compressing pump, which is shown in Figs. 1, 3, 5, 6, 7, and 8; second, the condenser, which is shown in Figs. 1, 2, and 3; third, the refrigerator, which is shown in Figs. 1 and 2. I prefer to arrange the gas-compressing engine on the opposite side of the compartment C from that occupied by the air-compressing pump already referred to, and sufficiently distant from the end of the car to provide room between it and the end of the car, and at one side of the air-compressing pump, for an attendant to enter for the purpose of oiling or regulating the machinery. This gas-compressing pump contains two cylinders—an air-cylinder, 16, about four inches in diameter by ten inches long, and a gas-cylinder, 17, about five inches in diameter and eight inches long—and each provided with a piston connected with the same crank-shaft, 18. The compressed air is admitted into the cylinder 16 through the pipe 19, leading from the reservoir l, which pipe is provided with a valve, which is connected with suitable mechanism for cutting the air off at about half-stroke in each direction, so that the latter half of each stroke is performed by the expansion of the air in the cylinder 16.

Figure 9:
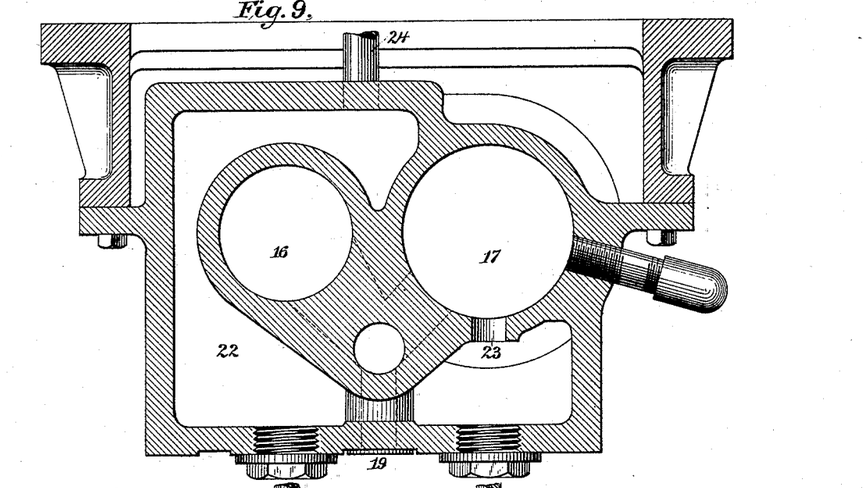
Fig. 9 represents a cross-section of the same thing on the line $y\ y$ of Fig. 6.

The cylinder 16 is a double-acting cylinder, and its ends project sufficiently beyond the ends of the cylinder 17 to permit the escape-passages 20 and 21, for the expanded air from the cylinder 16 to pass within the heads of the cylinder 17, as shown in Fig. 9. By this construction the expanded air, which, by reason of its expansion, is lowered in temperature, absorbs some of the heat from the gas being compressed in the cylinder 17, and a considerable amount of economy is produced.

The capacity of the cylinder 16 is preferably made about the same as the capacity of the cylinder 17, and for this purpose the diameter of the cylinder 16 is made sufficiently less than the diameter of the cylinder 17 to compensate for the extent to which the length of the cylinder 16 exceeds the length of the cylinder 17. By having the cylinder 16 longer than the cylinder 17, as described, not only is the economy already referred to produced, but the additional length of stroke which is thus afforded enables the expansion of the air to take place with greater efficiency in the cylinders, and less air is required to produce the required results.
As a means of accomplishing the further economy, I construct around the air-expanding cylinder 16 a chamber, 22. (Shown in Figs. 8 and 9.) 23 is an outlet from the cylinder 17 to the chamber 22, through which compressed gas escapes from the cylinder 17. 24 is an outlet-pipe from the chamber 22, through which the compressed gas is conducted to the condenser. This construction causes the gas, after being compressed in the cylinder 17, to traverse the chamber 22, surrounding the cylinder 16, and the exterior of the cylinder being cooled by the expansion of the air within it, a considerable quantity of the heat in the compressed gas passing around it is absorbed by said cylinder, which not only produces economy of cold, but also prevents the accumulation of frost on the exterior of the cylinder 16, which would be the case if said cylinder were exposed to the ordinary action of the atmosphere, and also prevents the accumulation of frost or ice in the valves, since in circulating through the chamber 22 the compressed gas also passes around the cut-off valve contained within the pipe 19. It will be understood that the relative lengths of the cranks on shaft 18 are properly regulated in accordance with the difference in length of stroke required by the two cylinders 16 and 17.

25 and 26 are fly-wheels located on the crank-shaft 18. Around one of these fly-wheels, as 25, may be passed a belt, o, so as to drive the fan c through the medium of the pulley p, located upon its shaft, which for that purpose extends through the partition between the compartments B and C.

The passages 20 and 21, already referred to, are connected by pipes 20 and 21 with the pipes 27 and 28. One of these pipes, 27, leads to the chamber D, and serves to conduct a portion of the expanded air from the gas-compressor, which is at a somewhat low temperature, into the chamber D, surrounding the condenser, where it absorbs heat from the condenser, and passes thence, through a suitable opening, out into the atmosphere. The other of these pipes, 28, leads into the compartment B, and serves to conduct a portion of the expanded air into the chamber B, where it mingles with the atmosphere of the chill-room, and serves to supply any leakage of air from that chamber, and at the same time to keep up a slight internal pressure of the atmosphere within that chamber, so as to prevent the entrance of dust and heated air, which would otherwise be carried into the chamber through crevices by any external air which might enter. The discharge of this pipe 28 is preferably located, as shown, in the upper portion of the compartment B, so that the expanded air may be still further cooled by contact with the refrigerator before it escapes into the chill-room proper. In case the suction-pipe of the air-compressing pump, instead of being connected with the atmosphere, is, as already suggested, connected with the chill-room of the car, then the pipe 27, instead of being connected with the chamber B, surrounding the condenser, should be omitted and the pipe 28 made sufficiently large to discharge all of the expanded air into the chamber B, where it would be cooled by the refrigerator preparatory to being returned to the chill-room.

30 is the pipe through which the gas is supplied to cylinder 17 for compression. This gas is taken from the refrigerator, with the interior of which the pipe 30 is connected at the top, as shown in Figs. 1, 2, 3. The refrigerator is located within the chamber B, and consists, preferably, of two or more horizontal parallel pipes, 31, connected with one another, and extending through the chamber B from one side of the car to the other, near its top, also two or more similar pipes connected with one another, and extending horizontally through the chamber B, near its bottom, from one side of the car to the other. These pipes 31 are preferably each about two and one-half inches in diameter.

32 are vertical pipes, each about one inch in diameter, which connect the upper and lower pipes, 31, at frequent intervals along their length, there being about one and one-fourth inch space between each pair of pipes 32.

33 is a pipe connecting the refrigerator with the condenser, through which pipe the compressed gas is conducted from the condenser, in which it is cooled, to the refrigerator, in which it is expanded. In this pipe 33 a valve, 34, is located, which may be adjusted so as to regulate the supply of the liquefied gas and keep the area of the supply-opening sufficiently small with reference to the exhaust-pipe 30, for the purpose of causing the gas-pump to produce a partial vacuum within the pipes 31 and 32 of the refrigerator, and thus cause the gas admitted through the pipe 33 to be expanded in a partial vacuum.

If found desirable, within the chamber B and around pipes 32 of the refrigerator deflectors may be located, for causing the air in its passage through the chamber to take a circuitous passage around the pipes, and thus be brought in close contact with them for the purpose of being cooled.

The condenser is shown in Figs. 1, 2, and 3, and is located within the compartment D, which, for economy of space, I prefer to arrange in such manner that it projects above the space occupied by the air and gas compressing pumps, and to a short distance at the side of said space. The condenser itself consists of two pipes, 36 and 37, which are about two inches in diameter, and extend horizontally across the chamber D in about the position shown. These are connected by the pipes 38 at frequent intervals, such pipes being about one inch in diameter. 39 is a pipe connecting one end of the condenser with the gas-compressing engine, and, as already stated, the other end of the condenser is connected with the refrigerator by the pipe 33.

For the purpose of removing the heat from the compressed gas passing through the pipes of the condenser, I cause a portion of the expanded air escaping from the gas-pump in the cold state to pass through the chamber D, as already described; or, in case this shall not be considered sufficient to sufficiently cool the gas within the condenser, I arrange a tank, $q$, upon the roof of the car, from which a suitable pipe conducts water into the chamber D, and distributes it upon the absorbent fibrous covering $r$, which lies in contact with the pipes of the condenser. In addition to this covering, I also prefer to envelop each of the pipes of the condenser with a thin wrapping of some material, like linen lawn, the object of both this envelope and the covering $r$ being to absorb the water received from the tank $q$, and distribute it in contact with the pipes, so that by its evaporation the cooling of those pipes is greatly facilitated.

When it is preferred, a funnel, $h$, may be arranged upon the outside of the car, connecting with the chamber D, surrounding the condenser, in such manner that the motion of the car in running will cause a current of air to be received in the funnel, and conducted thence over the pipes of the condenser and allowed to escape through openings in the rear of the car, or, as shown, through the funnel $s$; or any of the means already pointed out for cooling the condenser may be used in connection with the others.

The operation of the apparatus for refrigerating the air may be described as follows: The compressed air for driving the gas-compressor, having been stored in the cylinders 8, as already described, is, in the manner already described, delivered to the gas-compressing pump, so as to drive the same at a uniform rate of speed, and in passing from the air-expansion cylinder of the gas-compressing pump it passes, as already described, through such passages adjacent to the compression-cylinder as to absorb considerable of the heat which is generated by the compression of the gas. The gas, after being compressed in the cylinder 17 by the power thus supplied, is conducted thence through pipe 39 to the condenser, where it remains sufficiently long to be cooled by contact with the circulating air or water surrounding the pipes of the condenser. Having been cooled within the pipes of the condenser, the gas, in a liquid condition, passes through pipe 33 to the pipes 31 and 32 of the refrigerator, within which it is expanded in a partial vacuum, so as to produce intense cold. The intensity of this cold can be regulated to a considerable extent by means of the valve 34, already described, within the pipe 33, which regulates the extent of vacuum under which the gas is expanded. From the refrigerator the gas in the expanded state is conveyed through the pipe 30 back to the gas-compressing pump, after which the same operation is repeated upon the gas. The air within the chill-room passes up through openings in the pipe $b$, and is conducted through said pipe into the chamber B, surrounding the cold pipes of the refrigerator, and, having been in contact with said pipes a sufficiently long time to be cooled, the said air escapes through the opening $b'$, or conduits connected with said opening, back into the chill-room. This circulation may be intensified by the operation of the fan-blower $c$.

The volatile fluid which I prefer to employ in working my apparatus is chloride of ethyl, because it possesses advantages which are fully set forth in my application before referred to; but other fluids may be employed to advantage.

It will be noticed that by the arrangement of the check-valve 34 in the supply-pipe 33 the fluid is practically under compression up to the point of the check-valve, and the vacuum under which the expansion of the fluid takes place does not commence until the check-valve is passed. This check-valve is located in the pipe 33, near to where that pipe enters the pipes 31 of the refrigerator, so that the greater part of the expansion of the gas takes place in the lower pipes, 31, of the refrigerator, and whatever crystals are formed in this expansion are practically deposited in these enlarged pipes 31, so as not to obstruct the flow of gas. In case any are deposited in the pipe 33, between the check-valve 34 and where that pipe enters the refrigerator, the rapid flow of the fluid through that short section of pipe will be sufficient to force the crystals out into the refrigerator, so as to prevent any obstruction of the pipes. In practice, with the proportions of pipes shown, no part of the apparatus becomes clogged by the deposition of crystals, since in practical use the amount deposited in the pipes 31 will not be sufficient to obstruct the passage by reason of their enlarged area in comparison with the supply-pipe, and whenever the operation of the apparatus ceases, as it does at the end of the trip, when the car is opened, the crystals spontaneously evaporate by reason of the increase of temperature.

It will be noticed that the bottom of the condenser is above the level of the bottom of the refrigerator, so that no liquefied gas will accumulate in any part of the apparatus below the refrigerator. The chloride of ethyl will exist in the upper portion of the condenser in a gaseous state, which, as it gradually is converted, by being cooled, into a liquid condition, will accumulate to a limited depth at the bottom of the condenser. This liquid flows through the connecting-pipe into the bottom of the refrigerator, and in the relative arrangement shown in the drawings will accumulate in the refrigerator to a depth of from about one-half to two-thirds the height of the refrigerator. As it absorbs heat through the pipes of the refrigerator it is converted into a gas, which bubbles up through the liquid and accumulates at the top of the refrigerator, whence it is drawn off by the suction-pipe of the gas-compressing engine with sufficient rapidity to preserve a partial vacuum in the upper part of the refrigerator.

The construction of refrigerator shown presents an extended surface of the liquefied gas, from which the vaporized gas may readily escape from the various parts of the liquid where it is formed.

In comparison with other systems which have been employed for refrigerating-cars, I believe that my method herein described is superior in very many respects, among which may be mentioned that it requires less space in the car, requires no ice, and therefore may be run at a very much less cost to preserve a temperature which may be kept practically uniform. It removes the moisture and impurities from the air, and keeps it perfectly pure and dry, and at the same time, if need be, it may be used with all the advantages of a forced circulation through the chill-room.

So far as I am aware, the system which I have described is the first which has been devised by means of which the use of ice can practically be dispensed with for the operation of a refrigerating-car, and in this aspect my improvement will be useful to the extent of saving all of the difference in the costs between the great expense of ice and the comparatively small expense of running this apparatus.

I am aware of the patent to Ebenezer Hill, dated July 19, 1881, No. 244,602, and the patent of J. G. Wolf, dated March 19, 1879, No. 213,487, and make no claim to anything shown therein.

I claim—

1. The process of refrigerating the air in a chill-room, which consists of compressing air within one or more compressed-air compartments, compressing a volatile fluid in a compressor driven by the compressed air, cooling the compressed fluid, and expanding the same under a partial vacuum in a refrigerator, substantially as described.

2. The process of refrigerating the air of a chill-room, which consists of compressing air within one or more compressed-air compartments, compressing chloride of ethyl in a compressor driven by the compressed air, cooling the compressed chloride of ethyl, and expanding the same under a partial vacuum, substantially as described.

3. The method or process, substantially as described, of cooling air, which consists in compressing chloride of ethyl, condensing it by cooling, volatilizing it in a chamber of sufficient sectional area wherein to deposit its crystals without obstructing the passage of the gas, and conducting the volatilized fluid through constricted passages adjoining which the air circulates.

4. The method of driving an engine located upon a car, which consists in compressing and storing a gas by means of a pump operated by the motion of the car, and utilizing this gas for operating the engine, substantially as described.

5. The method of cooling a refrigerator located upon a car, which consists in compressing and storing a gas by means of a pump operated by the motion of the car, and utilizing this gas for operating an engine to compress a volatile fluid, which is first compressed, then passed through a condenser, where it is cooled, and then expanded in the refrigerator, substantially as described.

6. The herein-described method of cooling the air in a chill-room, which employs two bodies of gas, the first of which is compressed and employed to drive the engine in which the second is compressed, and the second, after being compressed by the power of the first, being cooled in a condenser, and then being expanded to produce the requisite cold in the refrigerator.

7. The herein-described method of cooling the air of a chill-room, which employs two bodies of gas, one of which, as air, is less easily compressed than the other, as chloride of ethyl, the first of these bodies of gas being compressed and employed to drive the engine in which the second body of gas is compressed, and the second body of gas being expanded in the refrigerator for producing the requisite cold therein.

8. The combination, substantially as described, with a railroad-car, of an air-compressor located on the car, and operated by the motion thereof, and one or more compressed-air-storage compartments, wherein compressed air may be stored to be used for driving apparatus located on the car.

9. A refrigerator-car divided into a compartment for containing the articles to be refrigerated, a compartment containing the air-compressing and gas-compressing engines, a compartment containing the condenser, and a compartment containing the refrigerator, the last three being all arranged in a group, and combined substantially as described.

10. In combination, the chill-room containing inlet and outlet air-openings, the air-circulating fan-blower, the refrigerator arranged in the path of the current of air produced by the fan-blower, the condenser, the gas-compressor operated by compressed air, the compressed-air-storage compartment, and the air-compressor, substantially as described.

11. In combination, the mechanism, substantially as described, whereby the prime gas-compressing pump is operated by the motion of the car, the prime gas-compressing pump, the storage-compartment, the pump wherein the gas used for cooling is compressed, the condenser, the refrigerator, and the chill-room.

12. In combination with the gas compressor and condenser, the refrigerator constructed with the horizontal pipe or pipes 31 and the branch pipes 32, leading upward therefrom, whereby an extended surface is exposed for the escape of the gas from the liquefied fluid, as set forth.

13. The combination, substantially as described, with a railroad-car, of a condenser, a refrigerator, and a gas-compressing engine connected with one or more compressed-air-storage compartments, wherein is stored a body of compressed air for driving the gas-compressing engine, the body of compressed air having no communication with the gas which is compressed.

14. In combination with the chill-room and the gas-compressing engine, a pipe leading from the expansion-cylinder of said engine to said chill-room, whereby the expanded air from the cylinder is conveyed to said chill-room to supply leakage and prevent the entrance of dust or warm air into the chill-room, substantially as described.

15. In combination with the car, the refrigerator and condenser, arranged relatively to each other substantially as described, so that the bottom of the condenser is above the level of the bottom of the refrigerator, whereby the liquefied gas will be prevented from collecting in any portion of the apparatus below the refrigerator.

16. In combination with the gas-compressing engine and the passage or pipe for conveying the compressed gas to the refrigerator, the said refrigerator containing gas-passages, in contact with the exterior of which the air of the chill-room circulates, and provided with a passage or passages, substantially as described, of large area relatively to the supply-passage, wherein the gas may expand and the obstructions of its passage be avoided.

17. In combination, the air-compressing pump, the gas-compressing engine, and suitable passages connecting the suction-pipe of the air-compressing pump with the escape-pipe of the expansion-cylinder of the gas-compressing engine, and other passages connecting the escape-pipe of the air-compressing pump with the induction-pipe of the expansion-cylinder of the gas-compressing engine, whereby the same supply of air is used over and over again.

18. In combination with the air-compressing engine located upon a car, the casing surrounding the cylinder of the same and forming an air-jacket, which is connected by air-ducts with the exterior atmosphere, whereby the motion of the car causes a circulation of air within said casing and around the compression-cylinder, substantially as described.

19. In combination with the compression-cylinder, the absorbent covering $f'$ and the water-tank, from which water is supplied to the covering through the pipe $f''$, substantially as described.

20. In combination with the compression-cylinder, the absorbent covering $f'$, the casing $f$, a suitable pipe for supplying the covering with moisture, and a suitable air-duct for causing a current of air to circulate within the casing, substantially as described.

21. In combination with the car-body, the condenser located upon the car for cooling the compressed fluid, the water-tank located at the top of the car, and a suitable pipe for conveying the water from the tank and distributing it upon the condenser, substantially as described.

22. In combination with the condenser, arranged within an inclosure or casing upon a car, inlet and outlet air-openings connected with said inclosure, substantially as described, whereby the motion of the car causes a current of air to flow in contact with said condenser, substantially as described.

23. In combination with the condenser arranged upon a car, an absorbent covering in contact with said condenser, water-pipes for conveying water from a suitable source of supply to said absorbent covering, and air-ducts, arranged substantially as described, whereby the motion of the car induces a current of air to pass in contact with said covering.

24. In combination with the condenser and the gas-compressing engine located on a car, a pipe leading from the expansion-cylinder of the engine to the condenser, whereby the cooled expanded air is brought into contact with the condenser to cool the same, substantially as described.

25. In combination with a railway-car, the air-compressor, the compressed-air-storage compartment, the gas-compressor, the condenser, the refrigerator, and the chill-room, all arranged and located on the car, substantially as described.

26. In combination with the cylinders 16 and 17, the compartment 22, connected with the cylinder 17, and surrounding the cylinder 16, substantially as described.

27. In combination with the cylinders 16 and 17, the air-passages 20 and 21, connected with the cylinder 16, and arranged, with reference to the cylinder 17, substantially as described.

28. In combination with the air-cylinder 16, the gas-compressing cylinder 17, constructed shorter than the cylinder 16, the pistons of the two cylinders being connected by suitable mechanism, whereby the expansion of the air in cylinder 16 compresses the gas in cylinder 17, as and for the purpose set forth.

29. In combination, the pulley connected with the axle of the car, the belt connecting said pulley with the air-compressor, the air-compressor, and the compressed-air-storage compartment, substantially as described.

30. In combination, the pulley connected with the axle of the car, the belt, whereby the motion of said pulley is communicated to apparatus on the car, reciprocating friction-rollers bearing against said belt, and mechanism, substantially as described, whereby said rollers are caused to approach each other and exert a yielding pressure upon said belt, for the purpose set forth.

31. In combination, the pulley connected with the car-axle, the belt whereby the motion of said pulley is communicated to apparatus on the car, a reciprocating friction-roller bearing against said belt, and adjustable bearings, whereby said roller may automatically incline to adjust itself to the varying inclinations of the belt, substantially as described.

32. In combination with the pulley upon the car-axle, the casing 15, secured to the spring-timber $m$ of the truck, substantially as described.

33. In combination with the pulley upon the car-axle, the casing inclosing the same, and the flexible apron $n$, connecting with the car-body, substantially as described.

34. In combination with the pulley connected with the car-axle, and the belt connecting the same with apparatus located on the car, the friction-rollers 12 12, mounted on the guide 13, and the spring whereby the rollers are caused to exert a yielding pressure against the belt, substantially as described.

35. In combination with the pulley connected with the car-axle and the belt for driving apparatus on the car from the same, a friction-roller arranged to be pressed against the belt by the yielding pressure of a spring, and the weighted lever 14, to which the spring is connected, whereby the belt can be released from the pressure of the spring by raising the lever whenever it is desired to stop the operation of the apparatus.

36. In combination, the chamber surrounding the condenser, the air-compressing pump having its suction-pipe connected with said chamber, and the expansion-cylinder of the gas-compressing engine, having its escape-pipe also connected with said chamber, whereby the air is taken from one part of said chamber, and after being compressed and expanded is delivered into another part of said chamber, substantially as described.

37. In combination with the compressing-pump, operated, substantially as described, by the motion of the car, the suction-pipe provided with the cut-off valve $j$, whereby the compressing-pump may cease compressing when the pressure produced has reached a predetermined intensity, substantially as described.

38. In combination with the gas-compressing engine and supply-pipe leading thereto, the pressure-regulating valve $k$ and the reservoir $l$, interposed between the valve $k$ and the gas-compressing engine, substantially as described.

39. The combination of the fan-blower with the compressing apparatus and suitable connections, whereby the operation of the compressing apparatus operates the fan-blower, substantially as described.

In testimony whereof I affix my signature in presence of two witnesses.

CASSIUS C. PALMER.

Witnesses:
DANIEL H. DRISCOLL,
CHARLES A. TERRY.